United States Patent
Shidara (10) Patent No.: US 10,981,444 B2
(45) Date of Patent: Apr. 20, 2021

(54) SHUTTER DEVICE

(71) Applicant: DENSO CORPORATION, Kariya (JP)

(72) Inventor: Yukio Shidara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/736,106

(22) Filed: Jan. 7, 2020

(65) Prior Publication Data
US 2020/0139806 A1    May 7, 2020

Related U.S. Application Data

(63) Continuation of application No. PCT/JP2018/022085, filed on Jun. 8, 2018.

(30) Foreign Application Priority Data

Jul. 25, 2017    (JP) .............................. JP2017-143595

(51) Int. Cl.
| | |
|---|---|
| B60K 11/08 | (2006.01) |
| B60K 11/04 | (2006.01) |
| F01P 11/10 | (2006.01) |
| B60K 11/06 | (2006.01) |

(52) U.S. Cl.
CPC ............ B60K 11/085 (2013.01); B60K 11/06 (2013.01)

(58) Field of Classification Search
CPC ....... B60K 11/085; B60K 11/04; B60R 19/52; B60R 2019/525; F01P 11/10
See application file for complete search history.

(56) References Cited

U.S. PATENT DOCUMENTS

| | | | | |
|---|---|---|---|---|
| 3,759,054 | A * | 9/1973 | Graber ................. | B60H 1/3227 62/183 |
| 9,902,256 | B2 * | 2/2018 | Yamamoto ............. | B60K 11/04 |
| 2011/0226541 | A1 | 9/2011 | Hori et al. | |
| 2013/0025952 | A1 * | 1/2013 | Kitashiba ............. | B60K 11/085 180/68.1 |
| 2015/0274002 | A1 * | 10/2015 | Vacca ................. | B29C 45/1704 180/68.1 |
| 2015/0330288 | A1 | 11/2015 | Nam et al. | |
| 2016/0236563 | A1 * | 8/2016 | Ruppert ................. | B60R 19/52 |
| 2017/0080794 | A1 | 3/2017 | Yamamoto et al. | |
| 2019/0184813 | A1 * | 6/2019 | Lindberg ............. | B29C 45/006 |

FOREIGN PATENT DOCUMENTS

| | | |
|---|---|---|
| JP | 57-89824 U | 6/1982 |
| JP | 2011-195039 A | 10/2011 |
| JP | 2015-217827 A | 12/2015 |

\* cited by examiner

*Primary Examiner* — Long T Tran
(74) *Attorney, Agent, or Firm* — Harness, Dickey & Pierce, P.L.C.

(57) ABSTRACT

A shutter device includes fins made of a plurality of plate-shaped members. Each of the fins is configured to switch between a state of blocking an air flow and a state of not blocking the air flow, a frame is configured to rotatably support the fins, and a link member is configured to transmit a driving force to each of the fins to operate the fins. Each of the fins is provided with a support protrusion rotatably supported by the frame, and a driving protrusion rotatably supported by the link member. A plurality of supporting grooves that accommodate the support protrusions therein are formed in the frame to recess along a predetermined direction. The link member prevents the support protrusion from being removed from the supporting groove.

11 Claims, 11 Drawing Sheets

SHUTTER DEVICE

CROSS REFERENCE TO RELATED APPLICATION

The present application is a continuation application of International Patent Application No. PCT/JP2018/022085 filed on Jun. 8, 2018, which designated the U.S. and claims the benefit of priority from Japanese Patent Application No. 2017-143595 filed on Jul. 25, 2017. The entire disclosures of all of the above applications are incorporated herein by reference.

TECHNICAL FIELD

The present disclosure relates to a shutter device.

BACKGROUND

A shutter device is provided at a front portion of a vehicle to temporarily suppress an air flow introduced into the engine room. The shutter device includes a plurality of fins that adjust an air flow, and the respective fins are connected to a link member. The plurality of fins may be operated at the same time by a driving force received from the link member.

SUMMARY

The present disclosure provides a shutter device that includes fins formed by a plurality of plate-shaped members and configured to switch between a state of blocking an air flow and a state of not blocking the air flow by rotating about a rotation axis extending along a longitudinal direction of the fin. A frame is configured to rotatably support the fins, and a link member is configured to transmit a driving force to each of the fins to operate the fins. Each of the fins is provided with a support protrusion which is a portion rotatably supported by the frame, and a driving protrusion which is a portion rotatably supported by the link member. A plurality of supporting grooves are formed in the frame to recede along a predetermined direction, and each of the supporting grooves is configured to accommodate the corresponding support protrusion therein.

Furthermore, the link member is configured to prevent the support protrusion from being removed from the supporting groove.

DESCRIPTION OF EMBODIMENTS

Air is introduced in an engine room at a front portion of a vehicle from a front grille. The air is used for heat dissipation at a radiator, for heat dissipation at a condenser in an air conditioner, and the like.

However, the engine room may be overcooled by the introduced air, for example, while the vehicle is traveling at a high speed or is traveling during winter, thus reducing the fuel efficiency of the vehicle. In particular, vehicles with a small heat emission from internal combustion engines, such as plug-in hybrid vehicles, are highly required to keep the engine room warm. To suppress the air resistance against the vehicle, the introduction of the air into the engine room may be preferably suppressed temporarily in some cases.

Thus, a shutter device is provided at the front portion of the vehicle to temporarily suppress an air flow introduced into the engine room. The shutter device includes a plurality of fins that adjust the air flow, and the respective fins are connected to a link member. The plurality of fins may be operated at the same time by a driving force received from the link member.

In the shutter device, cylindrical support protrusions provided on the respective fins may be inserted into circular through holes formed in a frame. Thus, the fins are rotatably supported by the frame.

When assembling the shutter device with such a configuration, the process of inserting the support protrusions into the through holes must be performed by the number of times that is the same as the number of fins. To simplify the assembly process of the fins, the present inventors have studied the configuration in which the support protrusions provided in the respective fins are accommodated inside grooves (but not the through holes) formed in the frame. The shutter device with such a configuration enables easy assembly of the plurality of fins to the frame, thus reducing the cost required to assemble the shutter device.

However, the shutter device with the above-mentioned configuration needs an additional fall-prevention member for preventing the support protrusion from being removed from the groove. Consequently, as the number of parts of the shutter device increases and it also costs more to perform the process of assembling the fall prevention member, the total cost of the shutter device may possibly be increased.

Therefore, the present disclosure is to provide a shutter device that can be easily assembled without increasing the number of parts.

A shutter device according to an exemplar of the present disclosure includes: fins that are formed by a plurality of plate-shaped members, each of the fins being configured to switch between a state of blocking an air flow and a state of not blocking the air flow by rotating about a rotation axis extending along a longitudinal direction of the fin; a frame configured to rotatably support the fins; and a link member configured to transmit a driving force to each of the fins to operate the fins. Each of the fins is provided with a support protrusion which is a portion rotatably supported by the frame, and a driving protrusion which is a portion rotatably supported by the link member. A plurality of supporting grooves are formed in the frame to recede along a predetermined direction, and each of the supporting grooves is configured to accommodate the corresponding support protrusion therein. Furthermore, the link member is configured to prevent the support protrusion from being removed from the supporting groove.

In the shutter device with such a configuration, the support protrusions provided in the fins are accommodated in the supporting grooves formed in the frame, and thereby the fins are configured to be rotatably supported. Thus, the process of assembling the fins to the frame can be easily performed.

In the above-mentioned shutter device, the link member prevents the support protrusion from being removed from the supporting groove. That is, the link member, which is an existing member, also serves as the fall prevention member without newly providing another fall prevention member that prevents the support protrusion from being removed from the groove. Therefore, any part or component for preventing the fall of the fin does not need to be newly added.

Accordingly, the present disclosure provides a shutter device that can be easily assembled without increasing the number of parts.

Hereinafter, detail examples of the present embodiments will be described with reference to the accompanying drawings. For easy understanding of the explanation, the same components in the respective drawings are designated by the same reference numerals as much as possible, and thus the repetitive description thereof is omitted below.

The configuration of a shutter device 10 according to a first embodiment will be described with reference to FIGS. 1 to 3. The shutter device 10 is provided in the vicinity of a front grille (not shown) of a vehicle and is configured as a device that adjusts the flow rate of air flowing thereinto from the front grille. The shutter device 10 includes a frame 100, fins 200, an actuator MT, and a link member 300.

The frame 100 is a rectangular frame body that rotatably supports the fins 200 to be described later. The frame 100 includes a top plate 110 and a pair of side plates 120. Although not shown, a bottom plate that has substantially the same shape as the top plate 110 is also provided at a lower end of the frame 100.

Figure 1:
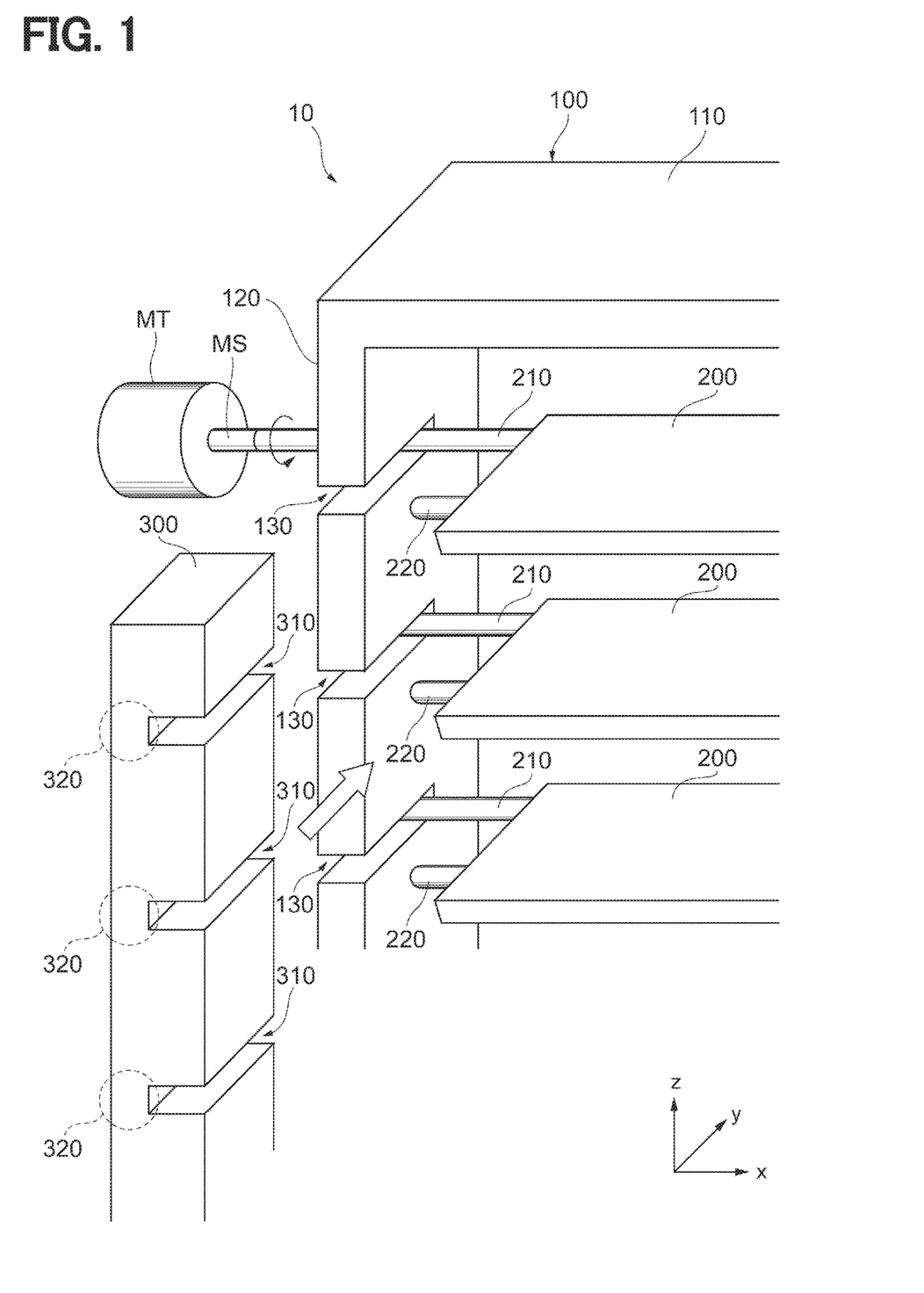
FIG. 1 is a diagram showing a configuration of a shutter device according to a first embodiment.

The top plate 110 is a rectangular plate member formed to extend in the left-right direction shown in FIG. 1. The side plates 120 are provided to extend from both ends of the top plate 110 in the longitudinal direction, downward as shown in FIG. 1.

Note that in FIG. 1, the x direction is defined as the direction oriented from left to right along the longitudinal direction of the top plate 110, and the x axis is set along the same direction. The z direction is defined as the direction oriented from the lower to upper side along the longitudinal direction of the side plate 120, and the z axis is set along the same direction. Furthermore, the y direction is defined as the direction that is perpendicular to both the x direction and the z direction (also referred to as the direction perpendicular to an opening surface of the frame 100) and which is oriented from the front to the back side in FIG. 1, and the y axis is set along the same direction. Also, in FIG. 2 and the following figures, the x axis, the y axis, and the z axis are set in the same manner as described above.

As shown in FIG. 1, a plurality of supporting grooves 130 are formed in one of the side plates 120 that is provided on the −x direction side in FIG. 1. Each of the supporting grooves 130 is a rectangular groove that is formed to recede along the y direction from an end surface of the side plate 120 on the −y direction side. The respective supporting grooves 130 have the same shape as each other and are arranged at equal intervals along the z direction. Each supporting groove 130 is a groove that accommodates therein a corresponding support protrusion 210 formed on the fin 200 to be described later.

Figure 2:
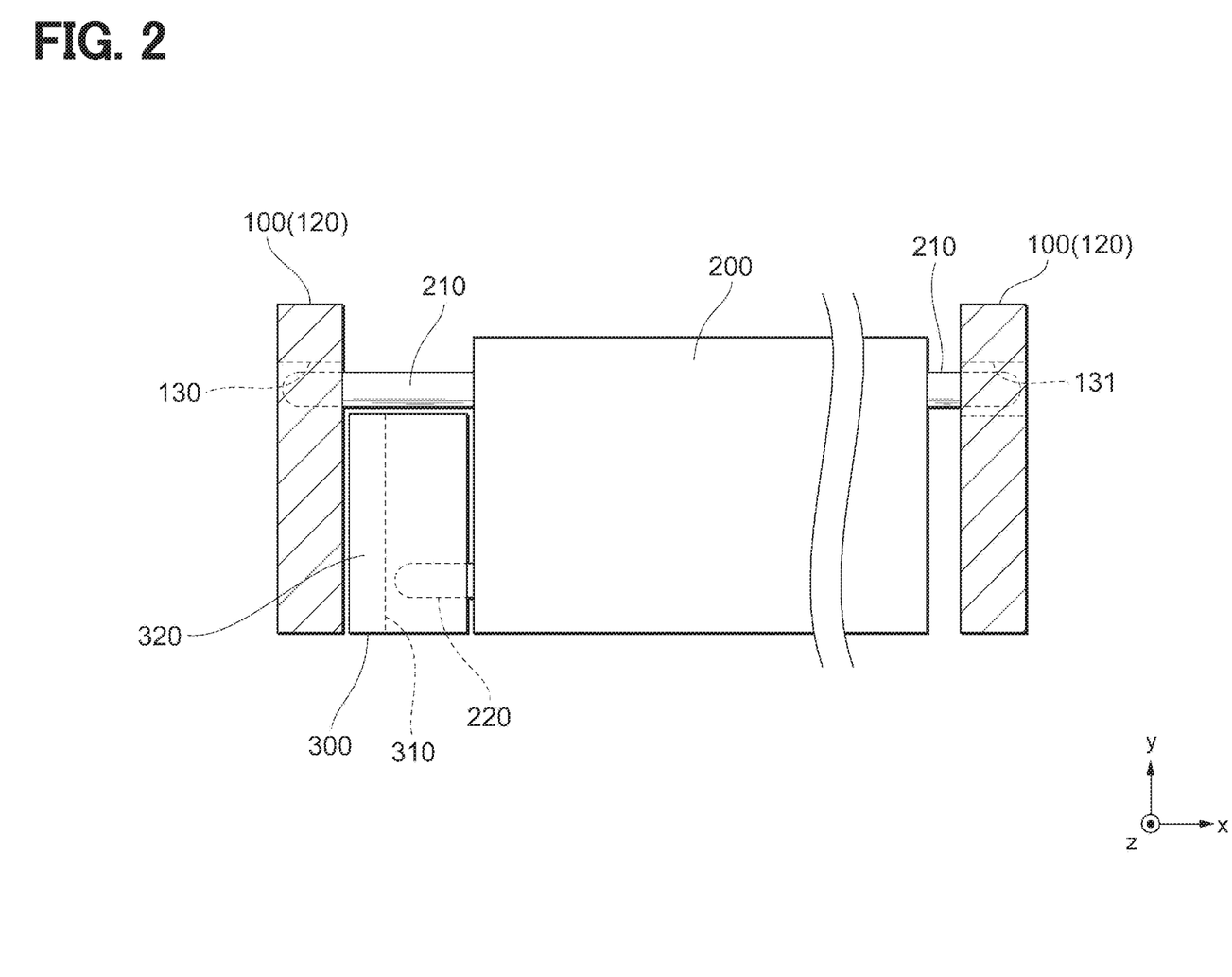
FIG. 2 is a diagram showing the configuration of the shutter device according to the first embodiment.
Figure 3:
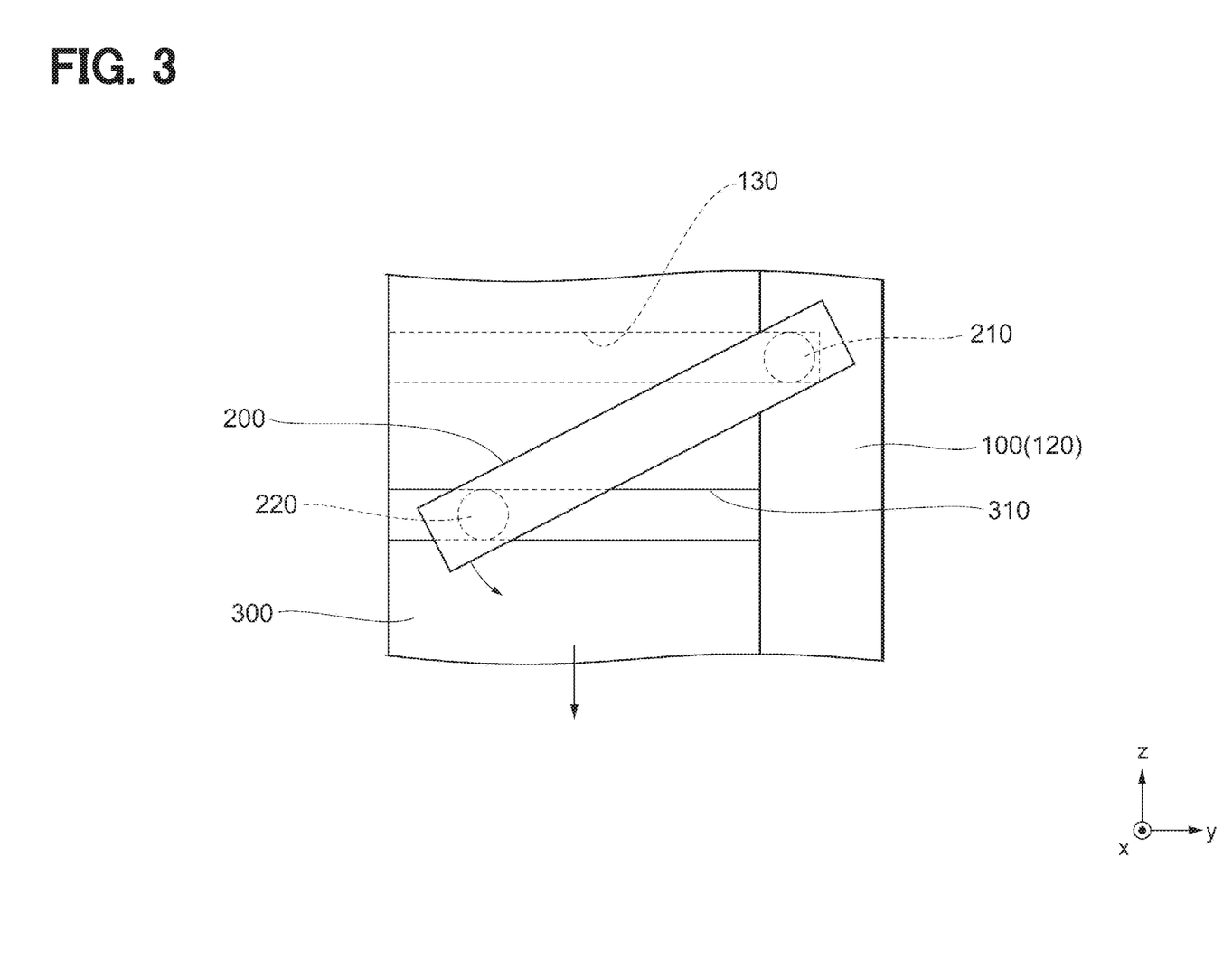
FIG. 3 is a diagram for explaining the operation of the shutter device shown in FIG. 1.

FIG. 2 is a diagram schematically showing a state of the shutter device 10 taken along the x-y plane and viewed from the z direction side. As shown in this figure, a plurality of through holes 131 are formed in the other of the side plates 120 that is provided on the x direction side. Each through hole 131 is a circular through hole. The respective through holes 131 have the same shape as each other and are arranged at equal intervals along the z direction. The position of each through hole 131 in the z direction coincides with the position of the corresponding supporting groove 130 in the z direction. The through hole 131 is a hole into which the support protrusion 210 formed on the fin 200 to be described later is inserted.

A plurality of fins 200 are provided in the shutter device 10. Each fin 200 is a plate-shaped member rotatably supported by the frame 100. The fins 200 are arranged side by side along the z direction so as to have their longitudinal directions aligned with the x axis. Each of the fins 200 switches between a state of blocking an air flow and a state of not blocking the air flow by rotating about a rotation axis along its longitudinal direction. The fin 200 is provided with a pair of support protrusions 210 and a driving protrusion 220.

As shown in FIG. 2, one of the support protrusions 210 is formed to extend from an end surface of the fin 200 located on the −x direction side, toward the −x direction side. The other support protrusion 210 is formed to extend from an end surface of the fin 200 located on the x direction side, toward the x direction side. Each support protrusion 210 has a cylindrical shape. The respective support protrusions 210 have their central axes coinciding with each other. The shape of the support protrusion 210 may be any shape other than the cylindrical shape.

The support protrusion 210 on the −x direction side is accommodated inside the corresponding supporting groove 130 formed in the side plate 120 and thereby supported rotatably by the supporting groove 130. The support protrusion 210 on the x direction side is inserted into the corresponding through hole 131 formed in the side plate and is thereby supported rotatably by the through hole 131. Thus, the support protrusions 210 are portions that are rotatably supported by the frame 100. The central axis of each support protrusion 210 becomes the rotation axis of the fin 200.

The driving protrusions 220 are formed to extend from the end surfaces of the fins 200 located on the −x direction side, toward the −x direction side. The position where the driving protrusion 220 is formed is located closer to the −y direction side than the position where the support protrusion 210 is formed. The driving protrusion 220 has a cylindrical shape similar to that of the support protrusion 210. The driving protrusions 220 are portions that receive the driving force from the link member 300 to be described later.

As shown in FIG. 1, in an opened state where the fins 200 are spaced apart from each other, air passes through a gap between the adjacent fins 200. On the other hand, in a closed state where the fins 200 are rotated to close the gap, the size of which is zero (i.e., in a state where the fins 200 are in contact with each other), the air flow is blocked by the fins 200.

The actuator MT is a rotary electrical machine that generates a driving force for rotating the frame 100. As shown in FIG. 1, the support protrusion 210 of the fin 200 located closest to the z direction side is made longer than each of the support protrusions 210 of the other fins 200 and is connected to a drive shaft MS of the actuator MT. Thus, when the actuator MT is driven to rotate the drive shaft MS, the support protrusion 210 also rotates together with the rotation of the drive shaft MS. In this way, the fin 200 located closest to the z direction side also functions as a member that directly receives the driving force from the actuator MT. The driving force of the actuator MT is also transmitted to the other fins 200 by the link member 300 to be described below.

The link member 300 is a member that transmits the driving force of the actuator MT to each fin 200 to operate the respective fins 200 at the same time. As shown in FIG. 2, the link member 300 is disposed at a position between the side plate 120 on the −x direction side and the fins 200. FIG. 1 shows a state in which the link member 300 is removed from the above-mentioned position toward the −y direction side.

As shown in FIG. 1, a plurality of driving grooves 310 are formed in the link member 300. Each driving groove 310 is a rectangular groove that is formed to recede along the −x direction, from the end surface of the link member 300 on the x direction side. Each driving groove 310 is also formed to extend along the y direction. The respective driving grooves 310 have the same shape as each other and are arranged at equal intervals along the z direction.

The driving protrusion 220 formed on the fin 200 is accommodated inside the corresponding driving groove 310. Thus, the driving protrusions 220 are rotatably held by the link member 300. The driving protrusions 220 can also slide along the direction (y direction) in which the driving grooves 310 extend.

The driving groove 310 of the present embodiment is formed as a groove that has both ends thereof along the y axis opened. Instead of this form, the driving groove 310 may have such a form that has only one end thereof on the y direction side opened and the other end thereof on the −y direction side closed.

The link member 300 is supported by a bearing (not shown) in a state of being movable along the z axis. Such a bearing is proposed to have a configuration, for example, in which a plurality of parts of the frame 100 protrude toward the x direction side so as to sandwich the link member 300 between both the y direction side and the −y direction side thereof.

The operation of the shutter device 10 will be described with reference to FIG. 3. FIG. 3 is a diagram schematically showing the fin 200, the link member 300, and the side plate 120 which is disposed on the −x direction side, as viewed from the x direction side. When the actuator MT is driven to rotate the drive shaft MS in the direction indicated by the arrow in FIG. 1, the fin 200 located closest to the z direction side rotates in the same direction, so that the driving protrusion 220 of this fin 200 moves to the −z direction side. When receiving a force from the driving protrusion 220, the link member 300 moves in the −z direction.

When the link member 300 moves to the −z side, all driving protrusions 220 accommodated in the driving grooves 310 of the link member 300 receive a force oriented in the −z direction from the inner surfaces of the driving grooves 310. Thus, the driving protrusions 220 of all the fins 200 that are not connected to the actuator MT also move to the −z direction side. Consequently, each fin 200 rotates about the central axis of the corresponding support protrusion 210 in the same direction as that described above. At this time, the driving protrusion 220 slides toward the y direction side inside the corresponding driving groove 310.

When the drive shaft MS of the actuator MT rotates in the reversed direction to that described above, the link member 300 moves to the z direction side, so that the respective fins 200 rotate in the opposite direction to that described above. Thus, the driving force of the actuator MT is transmitted to the driving protrusions 220 of all the fins 200 by the link member 300, thus operating all the fins 200 at the same time.

When assembling the shutter device 10 with such a configuration, the support protrusions 210 are inserted into the supporting grooves 130 while moving the respective fins 200 toward the y direction side, so that the fins 200 can be assembled to the frame 100. That is, the process of assembling the plurality of fins 200 can be completed from the −y direction side of the frame 100 without changing the posture of the members. Thus, the assembly cost can be reduced.

As indicated by the arrow in FIG. 1, also when attaching the link member 300 to the shutter device 10, the link member 300 can be moved from the −y direction side of the frame 100 in the y direction and then fitted into the frame 100. Both the process of assembling the fins 200 to the frame 100 and the process of assembling the link member 300 to the frame 100 can be performed from the same direction. Thus, the assembly cost can be further reduced.

However, the configuration that has the support protrusions 210 accommodated inside the supporting grooves 130 needs a fall prevention member that prevents the support protrusions 210 from being removed from the supporting grooves 130. In the shutter device 10 according to the present embodiment, the link member 300 also functions as the fall prevention member, which will be described below. That is, in the present embodiment, the link member 300 prevents the support protrusions 210 from being removed from the supporting grooves 130.

In FIG. 1, reference numeral 320 denotes a portion of the link member 300 extending from the bottom surface of the driving groove 310 to the −x direction side. This portion is also hereinafter referred to as a "groove bottom portion 320".

As shown in FIG. 2, the support protrusion 210 on the −x direction side is formed to be longer than the driving protrusion 220. The above-mentioned groove bottom portion 320 is positioned closer from the −y direction side to a portion of the support protrusion 210 which protrudes toward the −x direction side relative to the driving protrusion 220. Thus, when the support protrusion 210 is intended to move in the direction away from the supporting groove 130 (in the −y direction), the above-mentioned portion of the support protrusion 210 (the portion protruding toward the −x direction side relative to the driving protrusion 220) is abutted against the groove bottom portion 320. Consequently, the support protrusion 210 is prevented from being removed from the supporting groove 130.

Figure 9:
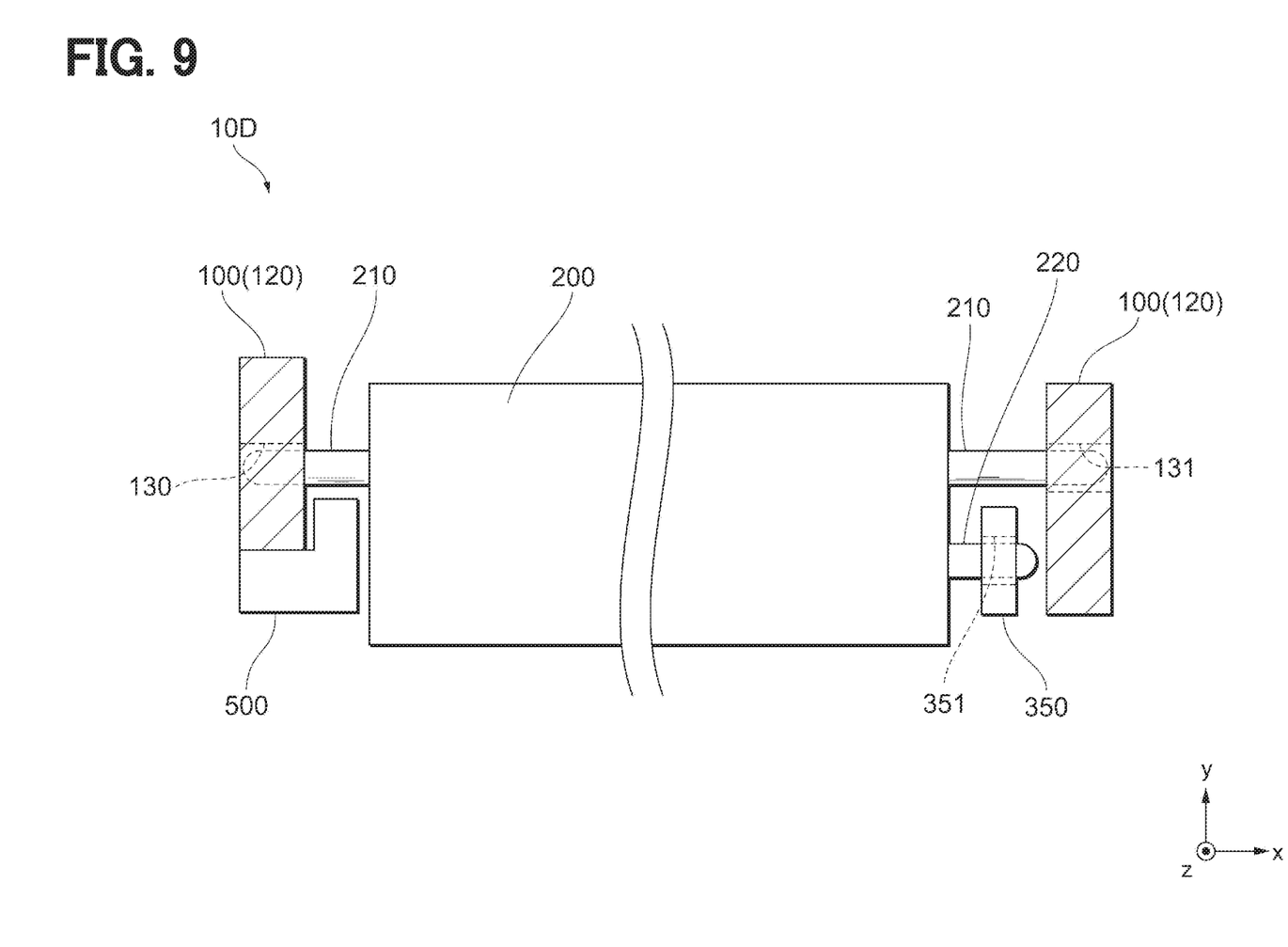
FIG. 9 is a diagram showing a configuration of a shutter device according to a first comparative example.

A fall prevention member is also proposed to be provided separately from the link member 300, as the configuration to prevent the support protrusion 210 from being removed from the supporting groove 130. A comparative example with such a configuration will be described with reference to FIG. 9. FIG. 9 shows a shutter device 10D according to a first comparative example.

In the shutter device 10D, a driving protrusion 220 is provided at the end surface of the fin 200 on the x direction side. The driving protrusion 220 is inserted into a through hole 351 of a link member 350. The link member 350 is a plate-shaped member that is provided to extend along the z axis. A plurality of the through holes 351 described above are formed in the link mechanism 350 so as to be arranged side by side along the z axis. By the link member 350, the driving force of the actuator MT is transmitted to each fin 200 to operate the respective fins 200 at the same time.

In a portion of the fin 200 on the −x direction side, the support protrusion 210 is accommodated inside the corresponding supporting groove 130 of the frame 100, like the above-mentioned first embodiment (see FIG. 2). In this comparative example, a fall prevention member 500 prevents the support protrusion 210 from being removed from the supporting groove 130.

The fall prevention member 500 is a member fixed to the side plate 120 of the frame 100. A part of the fall prevention member 500 is interposed between the side plate 120 and the fin 200 and extends to a position in the vicinity of the support protrusion 210. When the support protrusion 210 is intended to move in the direction away from the supporting groove 130 (in the −y direction), the support protrusion 210 is abutted against the fall prevention member 500. Consequently, the support protrusion 210 is prevented from being removed from the supporting groove 130.

In the first comparative example, the fall prevention member 500 is provided separately from the link member 350, thus increasing the number of parts, compared to the above-mentioned first embodiment. To assemble the link member 350 to the driving protrusions 220 of the fins 200, the link member 350 needs to be moved from the x direction side toward the −x direction side. In such a configuration, neither the process of assembling the fins 200 to the frame 100 nor the process of assembling the link member 300 to the frame 100 can be performed from the same direction, resulting in an increased assembly cost, compared to the first embodiment. As can be seen from the comparison with the first comparative example, the shutter device 10 according to the present embodiment enables the easy assembly of the fins 200, in addition to preventing an increase in the number of parts, unlike the comparative examples, thereby reducing the manufacturing cost.

In the configuration that has the driving protrusions 220 simply inserted into the through holes 351 of the link member 350, like the first comparative example, the link member 350 may perform reciprocating motion along the y axis together with an opening/closing operation of the fins 200. Thus, the driving protrusion 220 could be removed from the through hole 351. A description will be given on an example of the configuration that prevents this situation with reference to FIGS. 10 and 11.

Figure 10:
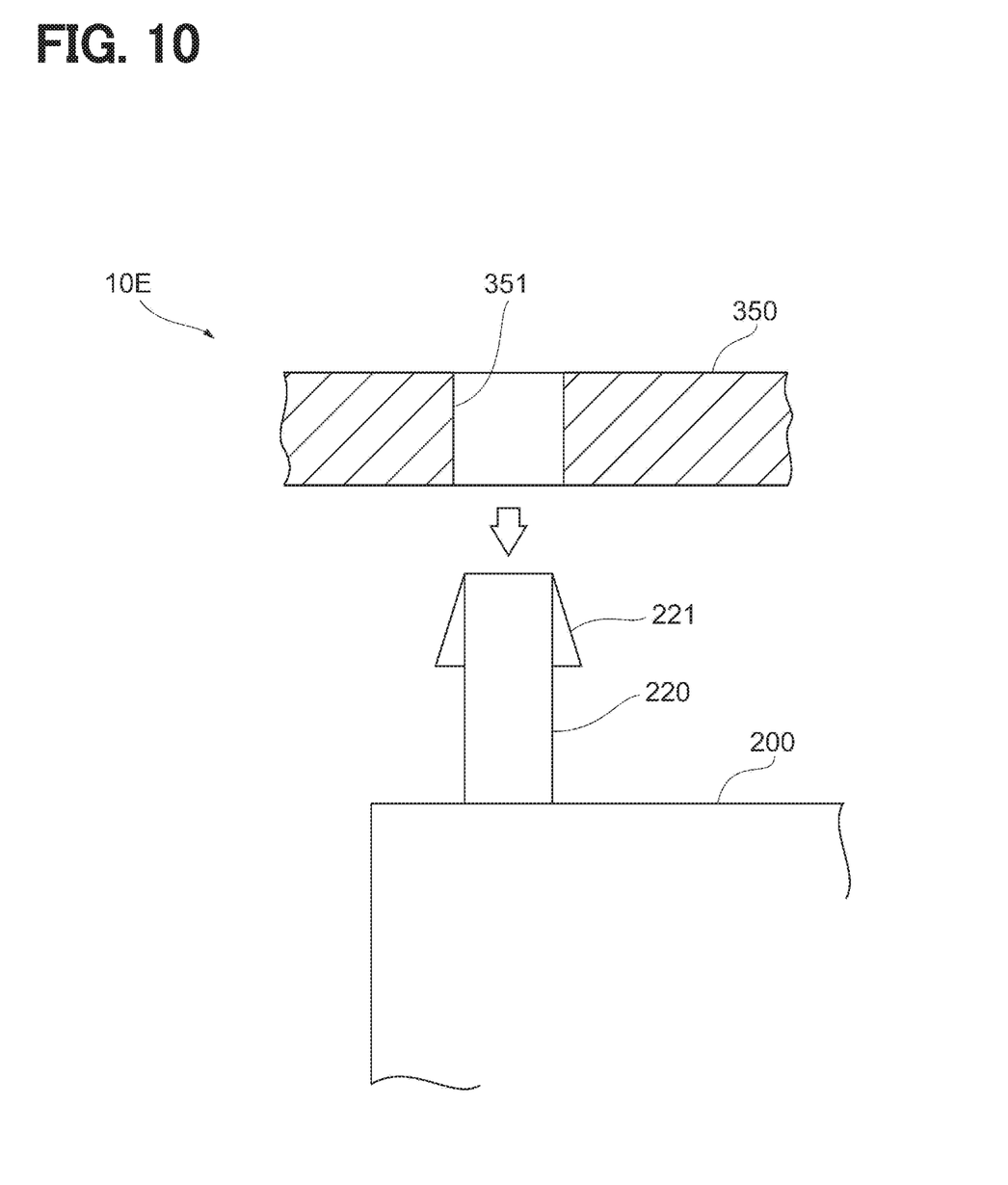
FIG. 10 is a diagram showing a configuration of a shutter device according to a second comparative example.

FIG. 10 shows a shutter device 10E according to a second comparative example. In the shutter device 10E, a retainer protruding piece 221 is formed in the vicinity of the tip of the driving protrusion 220. The protruding piece 221 is in a state of protruding from the side surface of the driving protrusion 220. When the driving protrusion 220 is inserted into the through hole 351, the protruding piece 221 is elastically deformed to be retracted toward the inside of the driving protrusion 220. Thereafter, when the insertion of the driving protrusion 220 into the through hole 351 is completed, the protruding piece 221 protrudes from the side surface of the driving protrusion 220 again. The protruding piece 221 prevents the driving protrusion 220 from being removed from the through hole 351.

Figure 11:
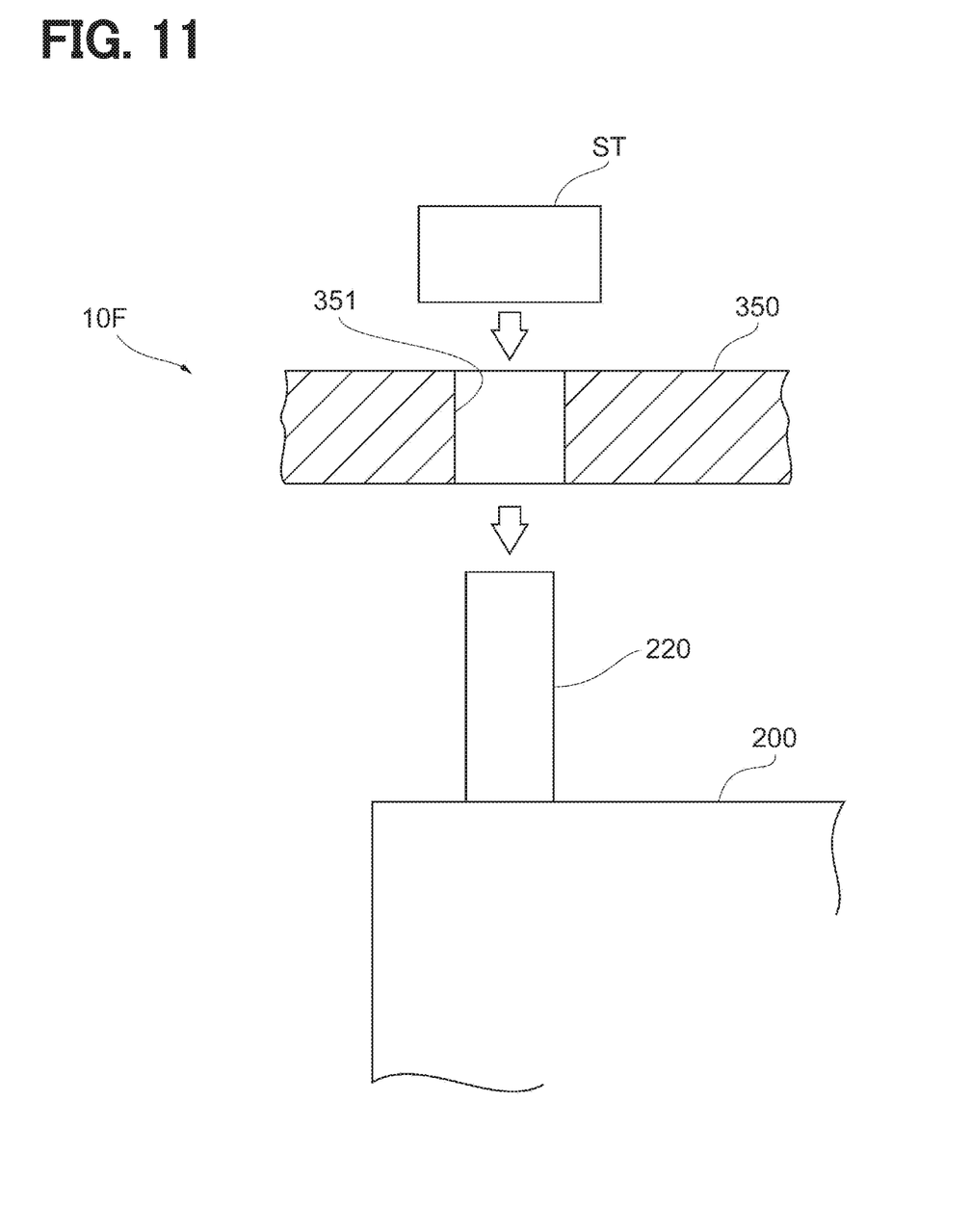
FIG. 11 is a diagram showing a configuration of a shutter device according to a third comparative example.

FIG. 11 shows a shutter device 10F according to a third comparative example. In the shutter device 10F, a removal prevention member ST that is a cylindrical member is attached to the tip of each driving protrusion 220. After the driving protrusion 220 is inserted into the through hole 351, the removal prevention member ST is attached and fixed to the tip of the driving protrusion 220. The diameter of the removal prevention member ST of the driving protrusion 220 is larger than the inner diameter of the through hole 351. The removal prevention member ST prevents the driving protrusion 220 from being removed from the through hole 351.

Because the protruding piece 221 is provided in the second comparative example shown in FIG. 10, the resistance caused when the driving protrusion 220 is inserted into the through hole 351 is increased. Thus, the second comparative example has a problem that the load required to assemble a number of fins 200 onto the link member 350 becomes large.

The third comparative example shown in FIG. 11 needs the removal prevention members ST, the number of which is the same as that of the fins 200, and also needs the process of attaching all the removal prevention members ST onto the tips of the driving protrusions 220. Thus, the third comparative example has a problem that the numbers of parts of the shutter device and of the processes therefor are drastically increased.

In contrast, unlike the second comparative example, the shutter device 10 according to the first embodiment does not have the problem of the large load required to assemble the fins 200 because the driving protrusions 220 only need to be disposed inside the respective driving grooves 310 of the link member 300. Furthermore, unlike the third comparative example, the shutter device 10 of the first embodiment does not have the problem of the drastically increased numbers of parts and processes because another member or part does not need to be attached to the driving protrusion 220.

The configuration of a shutter device 10A according to a second embodiment will be described with reference to FIGS. 4 to 6. In the following, differences between the first and second embodiments are mainly described, and the description of similarities therebetween are omitted as appropriate.

Figure 4:
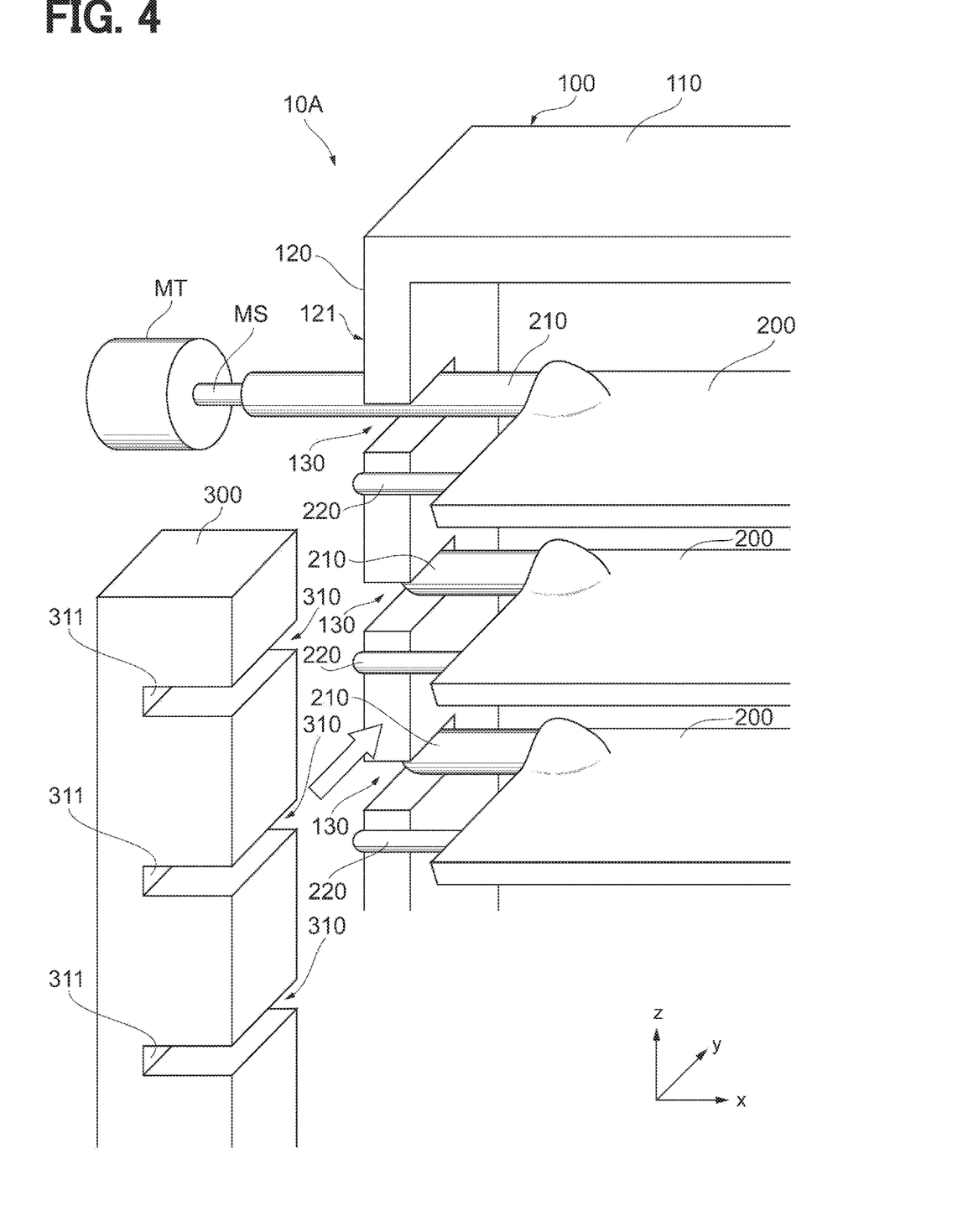
FIG. 4 is a diagram showing a configuration of a shutter device according to a second embodiment.

As shown in FIG. 4, in the shutter device 10A, the support protrusion 210 is thicker than the driving protrusion 220. Together with this, the groove width (width along the z axis) of the supporting groove 130 that receives the corresponding support protrusion 210 is larger than that in the first embodiment.

Figure 5:
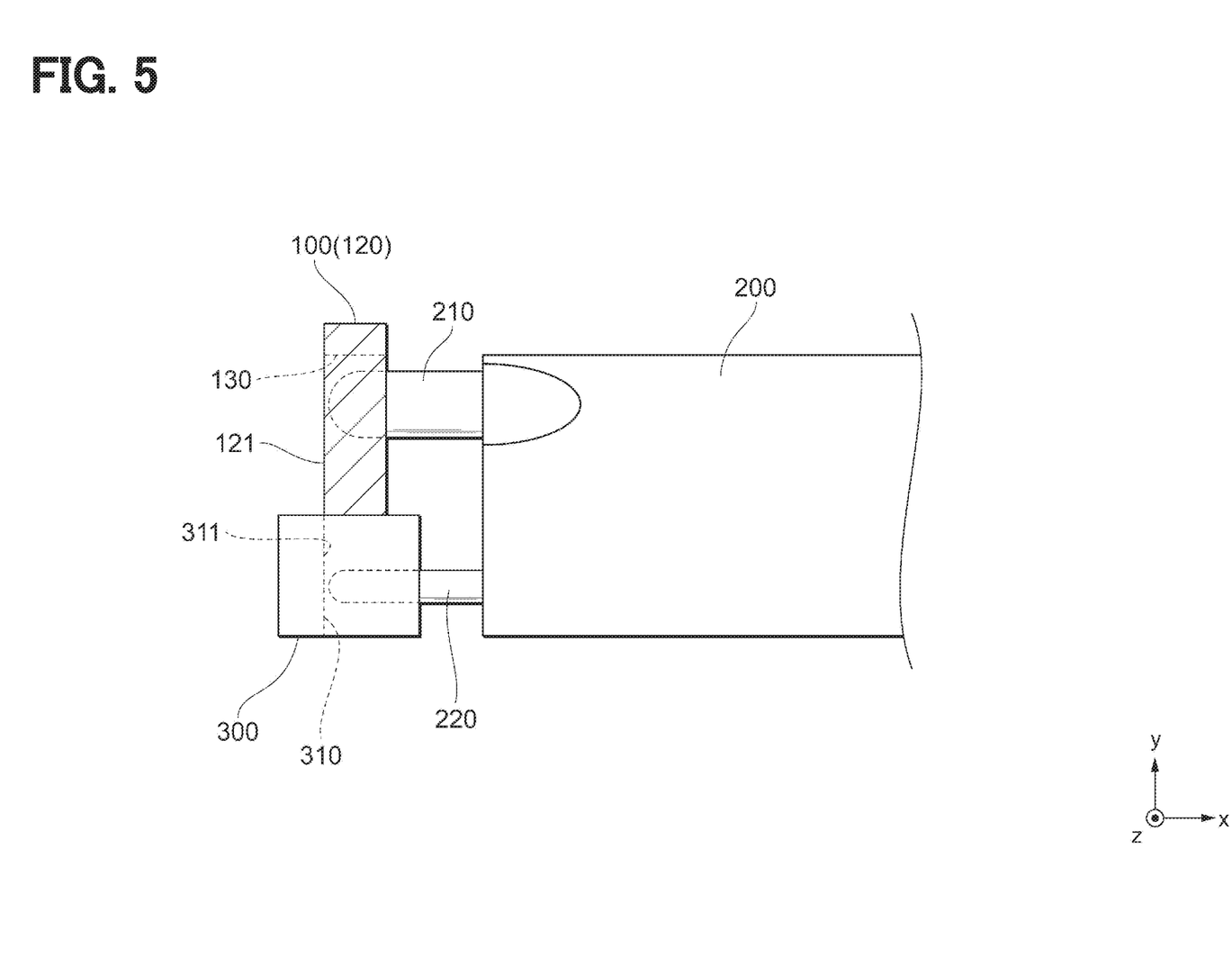
FIG. 5 is a diagram showing the configuration of the shutter device according to the second embodiment.

FIG. 5 is a diagram schematically showing a state of the shutter device 10A taken along the x-y plane and viewed from the z direction side. As shown in the figure, the tip of the fin 200 on the −y direction side in the present embodiment further protrudes toward the −y direction side, beyond the tip of the side plate 120 on the −y direction side. The length of the driving protrusion 220 is substantially the same as the length of the support protrusion 210.

The link member 300 of the present embodiment is disposed closer to the −y direction side than the side plate 120 and is movable along the z axis in the state of being abutted against the side plate 120. As shown in FIG. 5, a bottom surface 311 of the driving groove 310 is positioned on the same plane as a surface 121 of the side plate 120 on the −x direction side.

Figure 6:
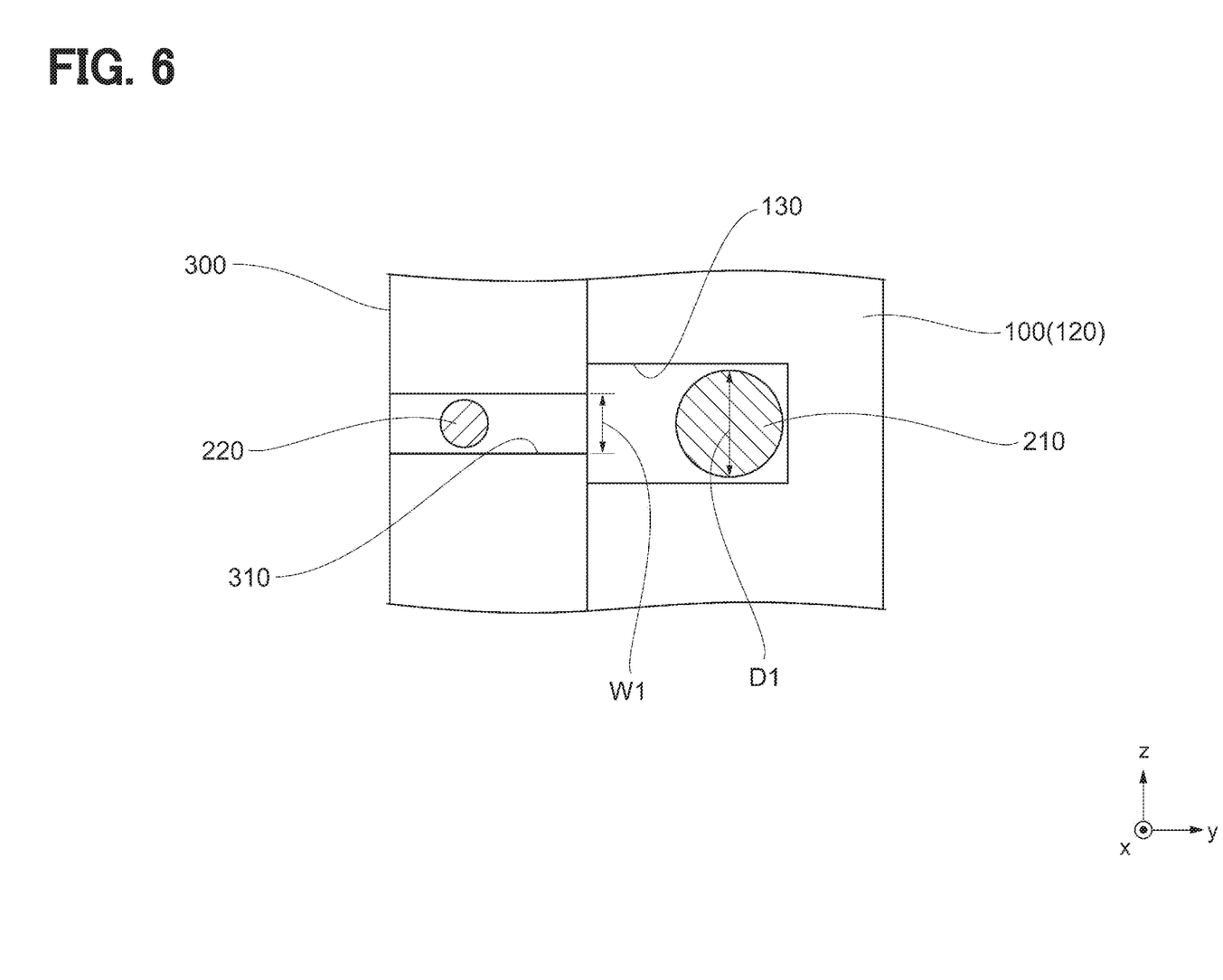
FIG. 6 is a diagram showing the configuration of the shutter device according to the second embodiment.

FIG. 6 is a diagram schematically showing the link member 300 and the side plate 120 disposed on the −x direction side, as viewed from the x direction side. In the present embodiment, the groove width W1 (width along the z-axis) of the driving groove 310 is smaller than the thickness (diameter D1) of the support protrusion 210.

Thus, even when the support protrusion 210 is intended to move in the direction away from the supporting groove 130 (in the −y direction), the support protrusion 210 cannot be inserted into the driving groove 310 and thereby is abutted and stopped against the edge of the driving groove 310.

Consequently, the support protrusion 210 is prevented from being removed from the supporting groove 130. Even this embodiment exhibits the same effects as those described in the first embodiment.

Figure 7:
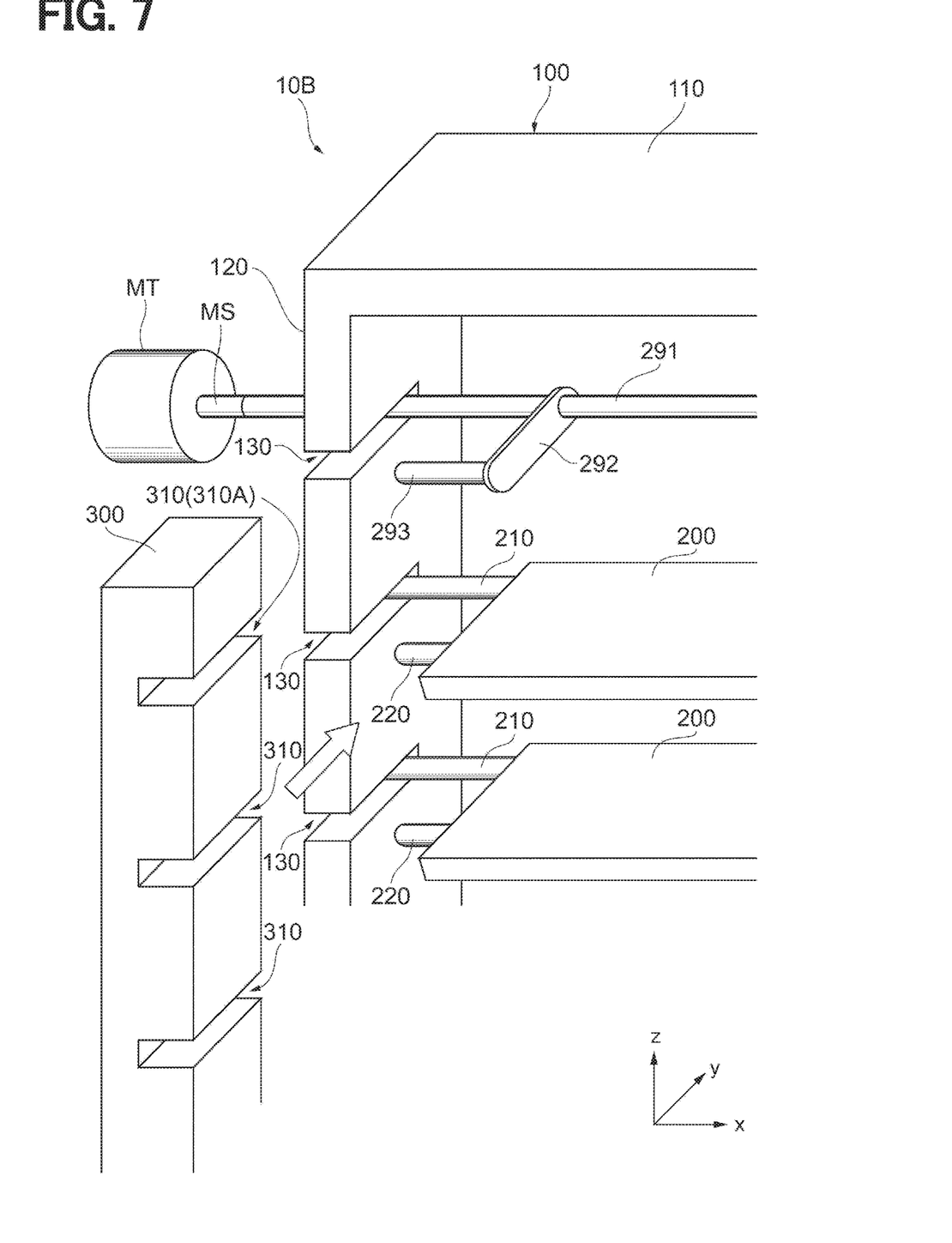
FIG. 7 is a diagram showing a configuration of a shutter device according to a third embodiment.

The configuration of a shutter device 10B according to a third embodiment will be described with reference to FIG. 7. In the following, differences between the first and third embodiments are mainly described, and the description of similarities therebetween are omitted as appropriate.

In the present embodiment, the drive shaft MS of the actuator MT is not connected to the support protrusion 210 of the fin 200 but is connected to a drive shaft 291. The drive shaft 291 is a cylindrical member and has its diameter that is substantially the same as the diameter of the support protrusion 210. The drive shaft 291 has its central axis along the x-axis and is accommodated inside the supporting groove 130 in the same way as the support protrusion 210.

A connection plate 292 is provided at a portion of the drive shaft 291 that is located closer to the x direction side than the side plate 120. The connection plate 292 is a plate-shaped member that is formed to extend in the direction perpendicular to the central axis of the drive shaft 291. A connection protrusion 293 is provided in the vicinity of the tip of the connection plate 292.

The connection protrusion 293 is a cylindrical member and is formed to extend from the connection plate 292 in the −x direction. The diameter of the connection protrusion 293 is substantially the same as the diameter of the driving protrusion 220. An x-coordinate of the tip of the connection protrusion 293 is substantially the same as an x-coordinate of the tip of the driving protrusion 220.

The connection protrusion 293 is accommodated inside the driving groove 310 formed closest to the z-direction side (i.e., the groove extending along the y direction), among the plurality of driving grooves 310 formed in the link member 300. This driving groove 310 is also hereinafter referred to as a "connection groove 310A". The shape of the connection protrusion 293 may be any shape different from the shape of the driving protrusion 220. In this case, the shape of the connection groove 310A may be set different from the shape of the other connection grooves 310 so as to support the connection protrusion 293.

Subsequently, the operation of the shutter device 10B will be described with reference to FIG. 7. When the actuator MT is driven to rotate the drive shaft MS in the direction indicated by the arrow in FIG. 7, the drive shaft 291 rotates in the same direction, so that the connection protrusion 293 moves to the −z direction side. The link member 300 receives a force from the connection protrusion 293 and thereby moves to the −z direction side.

When the link member 300 moves to the −z direction side, all driving protrusions 220 accommodated in the driving grooves 310 of the link member 300 receive a force oriented in the −z direction from the inner surfaces of the driving grooves 310. In this way, the driving protrusions 220 of all the fins 200 also move to the −z direction side. Consequently, each fin 200 rotates about the central axis of the support protrusion 210 in the same direction as described above.

When the drive shaft MS of the actuator MT rotates in the reversed direction to that described above, the link member 300 moves to the z direction side, so that the respective fins 200 rotate in the opposite direction to that described above. Thus, the driving force of the actuator MT is transmitted to the driving protrusions 220 of all the fins 200 by the link member 300 even in the present embodiment, thus operating all the fins 200 at the same time.

Thus, the drive shaft 291 serves to transmit the driving force from the actuator MT to the link member 300. The connection protrusion 293 provided in the drive shaft 291 is a portion connected to the connection groove 310A of the link member 300. Like the present embodiment, even the configuration that transmits the driving force from the actuator MT not directly to the fins 200, but indirectly to the fins via another member can exhibit the same effects as those described in the first embodiment.

Figure 8:
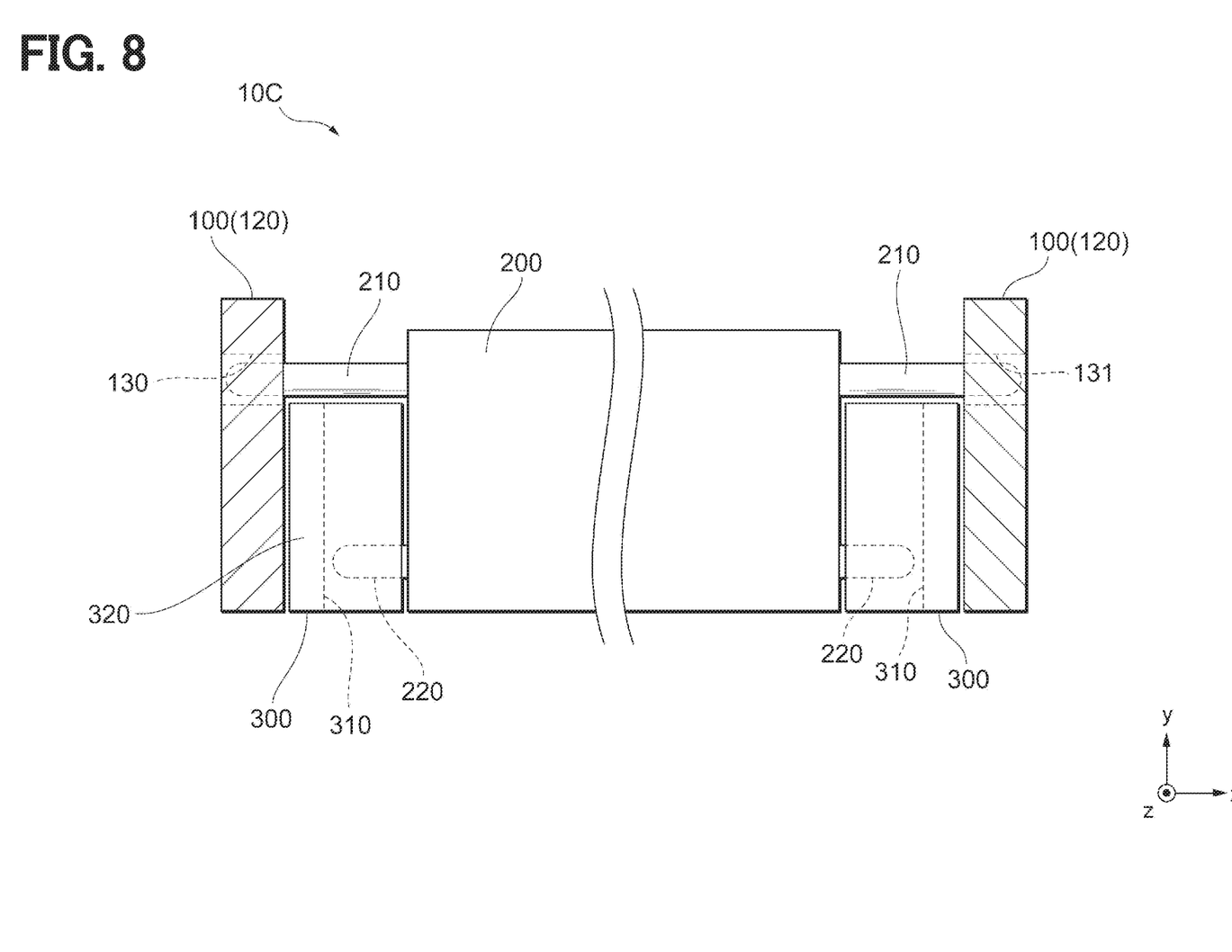
FIG. 8 is a diagram showing a configuration of a shutter device according to a fourth embodiment.

The configuration of a shutter device 10C according to a fourth embodiment will be described with reference to FIG. 8. In the following, differences between the first and fourth embodiments are mainly described, and the description of similarities therebetween are omitted as appropriate.

In the present embodiment, other driving protrusions 220 are also formed in the parts of the fins 200 on the x direction side. Another link member 300 that has the same shape as the link member disposed on the −x direction side is also disposed at the position on the x direction side of the fin 200. The driving protrusions 220 on the x direction side are accommodated inside the respective driving grooves 310 formed in the link member 300.

In this way, the fins 200 and their support structures are configured to be laterally symmetric with respect to the y-z plane in the present embodiment. In such a configuration, the process of assembling the plurality of fins 200 and the link members 300 can be completed by simply moving the respective members linearly from the −y direction side of the frame 100 in the y direction. Thus, the assembly cost can be further reduced.

The present embodiment has been described above with reference to the specific examples. However, the present disclosure is not limited to these specific examples. Modifications or changes made by a person skilled in the art to these specific examples as appropriate are included in the scope of the present disclosure as long as they have the features of the present disclosure. Each element included in the respective specific examples described above and the arrangement, conditions, shape, and the like of these elements are not limited to those exemplified and can be changed as appropriate. The respective elements included in the specific examples described above can be appropriately combined together as long as there occurs no technical contradiction between them.

What is claimed is:

1. A shutter device comprising:
fins made of a plurality of plate-shaped members, each of the fins being configured to switch between a state of blocking an air flow and a state of not blocking the air flow by rotating about a rotation axis extending along a longitudinal direction of the fin;
a frame configured to rotatably support the fins; and
a link member configured to transmit a driving force to each of the fins to operate the fins, wherein
each of the fins is provided with a support protrusion which extends in a protrusion direction and is a portion rotatably supported by the frame, and a driving protrusion which is a portion rotatably supported by the link member,
a plurality of supporting grooves are provided in the frame to be recessed from an end surface of the frame along a predetermined direction intersecting with the protrusion direction, each of the supporting grooves having a groove bottom surface and being configured to accommodate the corresponding support protrusion therein, and the link member is configured to prevent the support protrusion from being removed from the supporting groove.

2. The shutter device according to claim 1, wherein
a plurality of driving grooves are formed in the link member to extend along the predetermined direction, each of the driving grooves being configured to accommodate the corresponding driving protrusion therein.

3. The shutter device according to claim 2, wherein
the support protrusion is longer than the driving protrusion, and
a portion of the support protrusion that protrudes beyond a tip of the driving protrusion is abutted against the link member, thereby preventing the support protrusion from being removed from the supporting groove.

4. The shutter device according to claim 2, wherein
a groove width of the driving groove is smaller than a thickness of the support protrusion.

5. The shutter device according to claim 1, further comprising
a drive shaft configured to transmit a driving force from an actuator to the link member.

6. The shutter device according to claim 5, wherein
the drive shaft is provided with a connection protrusion that is a portion connected to the link member, and
a connection groove is provided in the link member to extend along the predetermined direction, the connection groove being configured to accommodate the connection protrusion therein.

7. The shutter device according to claim 1, wherein
the link member is provided with a plurality of driving grooves recessed from an end surface of the link member,
each of the driving grooves has a groove bottom surface and extends in the predetermined direction, and
the driving protrusions are respectively movably accommodated in the corresponding driving grooves.

8. The shutter device according to claim 1, wherein
the support protrusion of the fin contacts the groove bottom surface of the driving groove to prevent the support protrusion from being removed from the supporting groove.

9. The shutter device according to claim 1, wherein
the predetermined direction in which each of the supporting grooves extends is substantially perpendicular to the protrusion direction of the support protrusion.

10. The shutter device according to claim 1, wherein
each of the supporting grooves are rectangular in shape.

11. The shutter device according to claim 1, wherein
the plurality of supporting grooves are arranged equidistant from each other along the frame.

\* \* \* \* \*